United States Patent [19]

Nagasaki et al.

[11] 4,131,303
[45] Dec. 26, 1978

[54] TELESCOPIC ASSEMBLY FOR PIPES FOR CONVEYING FLUIDIZED MATERIALS

[75] Inventors: Katsumi Nagasaki, Sakai; Koichi Tanimura, Suita; Yoshihiro Inoue, Nishinomiya; Hiroyuki Yamazaki, Amagasaki; Tetsuo Momose, Hirakata, all of Japan

[73] Assignee: Kubota, Ltd., Osaka, Japan

[21] Appl. No.: 812,683

[22] Filed: Jul. 5, 1977

[30] Foreign Application Priority Data

Jul. 8, 1976 [JP] Japan .................................. 51-81554

[51] Int. Cl.² ............................................. F16L 27/12
[52] U.S. Cl. .................................... 285/302; 277/24; 285/320
[58] Field of Search .................... 277/24, 53; 285/302, 285/320

[56] References Cited

U.S. PATENT DOCUMENTS

| 32,464 | 6/1861 | Bunnell | 285/320 |
| 1,130,358 | 3/1915 | Whitney | 285/302 |
| 1,420,217 | 6/1922 | Richards | 285/302 X |
| 1,944,748 | 1/1934 | Leach | 285/320 X |
| 1,972,084 | 9/1934 | Bogart | 285/302 |
| 2,368,137 | 1/1945 | Harmon | 277/24 |
| 2,727,797 | 12/1955 | Snyder | 277/58 X |
| 3,049,370 | 8/1962 | Bertrand | 277/24 X |
| 3,659,306 | 5/1972 | Stoltze et al. | 277/24 X |

FOREIGN PATENT DOCUMENTS

| 248808 | 8/1966 | Austria | 285/320 |
| 1295931 | 5/1969 | Fed. Rep. of Germany | 285/302 |
| 724647 | 2/1955 | United Kingdom | 277/53 |
| 978980 | 1/1965 | United Kingdom | 277/24 |

Primary Examiner—Thomas F. Callaghan
Attorney, Agent, or Firm—Joseph W. Farley

[57] ABSTRACT

A telescopic assembly for pipes for conveying powdery to granular materials entrained in an air or like gaseous stream comprises two pipes of different diameters coaxially fitting one within the other and axially slidable relative to each other, a labyrinth packing provided around a front end portion of the inner pipe for preventing leakage of the stream or ingress of the atmosphere through the clearance between the two pipes, and a scraper attached by a plate spring to the retainer ring of the labyrinth packing on the front end of the inner pipe and in pressing contact with the inside peripheral surface of the outer pipe. Rollers carried by the outer pipe engage the outer surface of the inner pipe and aid in maintaining a uniform clearance between the two pipes.

9 Claims, 5 Drawing Figures

TELESCOPIC ASSEMBLY FOR PIPES FOR CONVEYING FLUIDIZED MATERIALS

This invention relates to a telescopic assembly for pipes, and more particularly to a telescopic assembly for pipes for conveying fluidized materials such as powdery to granular materials entrained in an air or like gaseous stream.

Typical of such conveyor pipes are those used in air conveyors for handling bulk materials in warehouses or holds, especially those included in air conveyors for handling powdery to granular materials such as flour by suction, and those employed in apparatus for removing rubbish and other waste materials from factories, warehouses and holds by suction. Conveyor pipes are also used in systems for removing scum from the surface of molten metal, by which the scum floating on the molten metal is sucked and water is applied to the sucked scum to rapidly cool and solidify the scum to pellets, whereupon the pelletized scum is run off from the system along with the water through the conveyor pipe. Conveyor pipes are further used for various other applications.

In these uses, one end of the conveyor pipe is usually connected to an air withdrawing service, suction pump, ejector or like fixed device, while the other end of the pipe serving as an inlet for the material to be conveyed must be freely movable to the location of the material. Thus there is the necessity of incorporating an intermediate extensible portion in the pipe. Such extensible portion is usually provided by a bellows pipe which is most easy to install. However, if the material to be conveyed is of such nature that it tends to adhere to the inner surface of the pipe, the material will lodge and accumulate on the pleated inner wall of the bellows pipe, thereby constricting the flow passage and possibly clogging up the pipe. Especially in the case of the scum conveying pipe, the scum is liable to adhere to the inner surface of the pipe. The use of a bellows pipe must therefore be avoided, because the scum would clog up the pipe and block the suction, permitting water to fall onto the molten metal. These problems will be overcome by the use of a telescopic assembly of two pipes slidable one within the other and each having a smooth inside surface. It is then required that the assembly incorporate means which seals the clearance between the pipes while permitting a sliding movement therebetween and which is serviceable free of rupture or wear that would occur if the material to be conveyed is forced into the sealing portion during the sliding movement. However, none of the means heretofore available have fulfilled all of these requirements.

The main object of this invention is to provide a telescopic assembly comprising two pipes slidably fitting one within the other and each having a smooth inside surface, the assembly being provided between the pipes with a seal permitting sliding of the pipes and free of ingress of the material to be conveyed.

The present invention therefore provides a telescopic assembly comprising two pipes coaxially fitting one within the other and axially slidable relative to each other, a labyrinth packing provided between the two pipes at a fitting portion, and a scraper attached by an elastic member to the front end of the inner pipe and in pressing contact with the inside peripheral surface of the outer pipe.

With this assembly, the labyrinth packing around the inner pipe serves as an effective seal while permitting axial sliding of the pipes relative to each other and is not prone to abrasion because of its structure. Furthermore when the inner pipe moves into the outer pipe, the scraper removes the deposit of the material to be conveyed from the inside surface of the outer pipe, thereby eliminating the likelihood that the material will be forced into the labyrinth packing to wear or damage the packing.

Preferably, the labyrinth packing comprises a stopper ring mounted on the outside peripheral surface of the inner pipe, a plurality of sealing rings arranged at suitable spacing in the axial direction of the pipe with a very small clearance formed between the inside peripheral surface of the outer pipe and the outer periphery of each of the sealing rings, distance rings disposed between the sealing rings, and a retainer ring fitting around the front end of the inner pipe in screw-thread engagement therewith.

According to a preferred embodiment of this invention, the scraper is divided into a plurality of pieces arranged circumferentially of the pipe, and each of the divided pieces is attached to the front end of the inner pipe by a plate spring. The scraper of this embodiment has a simple structure and yet acts effectively.

Another object of this invention is to provide a telescopic assembly for conveyor pipes in which the above-mentioned two pipes are smoothly slidable relative to each other axially thereof and the labyrinth packing gives a stabilized sealing effect and is serviceable for a prolonged period of time.

To this end, the present invention further provides an assembly of the type described in which the outer pipe has at its one end spacer means for maintaining a uniform clearance between the inner pipe and the outer pipe. With this construction, a uniform clearance is maintained between the two pipes by the scraper at one end of the overlapping section of the two pipes and by the spacer means at the other end thereof. This renders the two pipes smoothly slidable axially thereof relative to each other and further eliminates the likelihood that the sealing rings of the labyrinth packing will wear away owing to their sliding contact with the inside peripheral surface of the outer pipe, thus giving a prolonged life to the labyrinth packing.

According to the preferred embodiment of this invention, the spacer means comprises rollers in contact with the outside peripheral surface of the inner pipe and means for supporting the rollers at one end of the outer pipe. Preferably, a lever carrying the roller at its one end is pivotably mounted on the end of the outer pipe, and the lever is provided with means for locking the lever in an angularly adjustable position, whereby the clearance is accurately adjustable.

Various other features and advantages of this invention will be readily understood from the following description of the preferred embodiments of the invention with reference to the accompanying drawings, in which.

Figure 1:
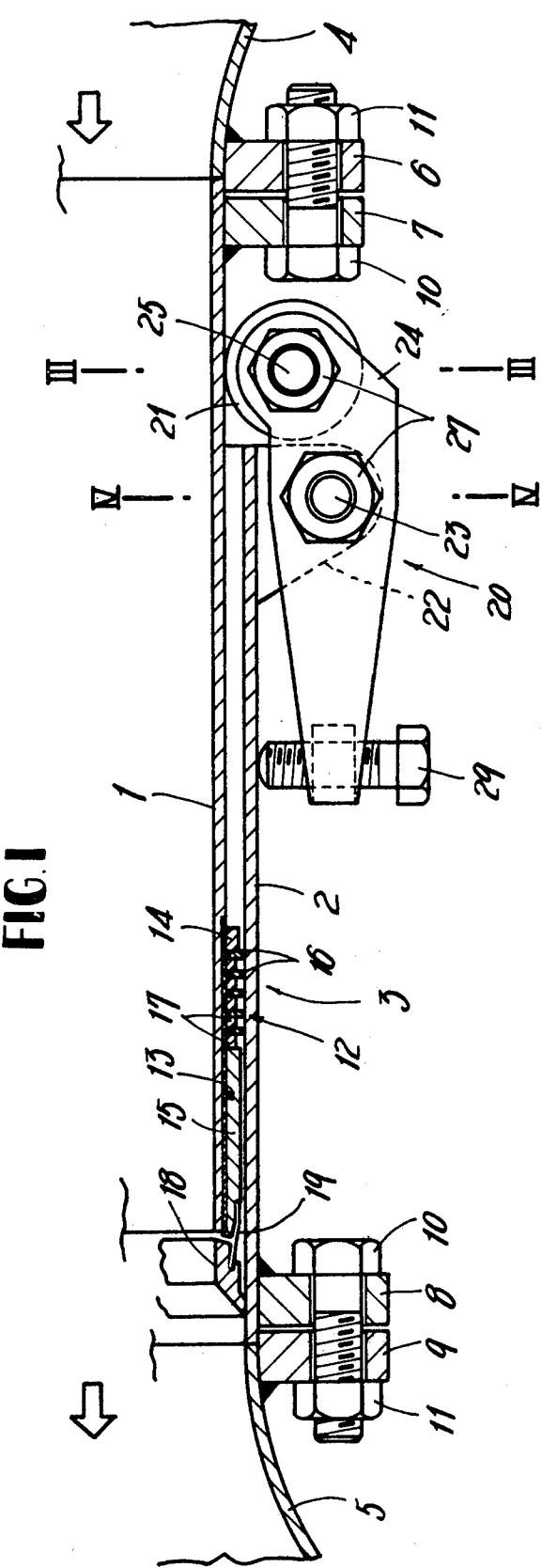
FIG. 1 is a fragmentary view partly in vertical section and showing a first embodiment of the telescopic assembly of this invention for conveyor pipes.
Figure 2:
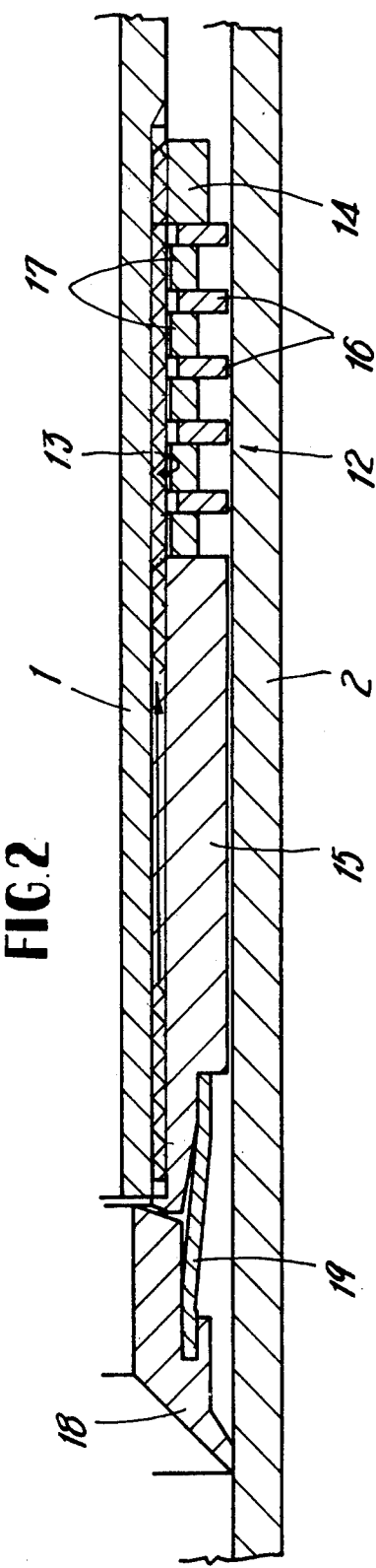
FIG. 2 is an enlarged view of the labyrinth portion shown in FIG. 1.
Figure 3:
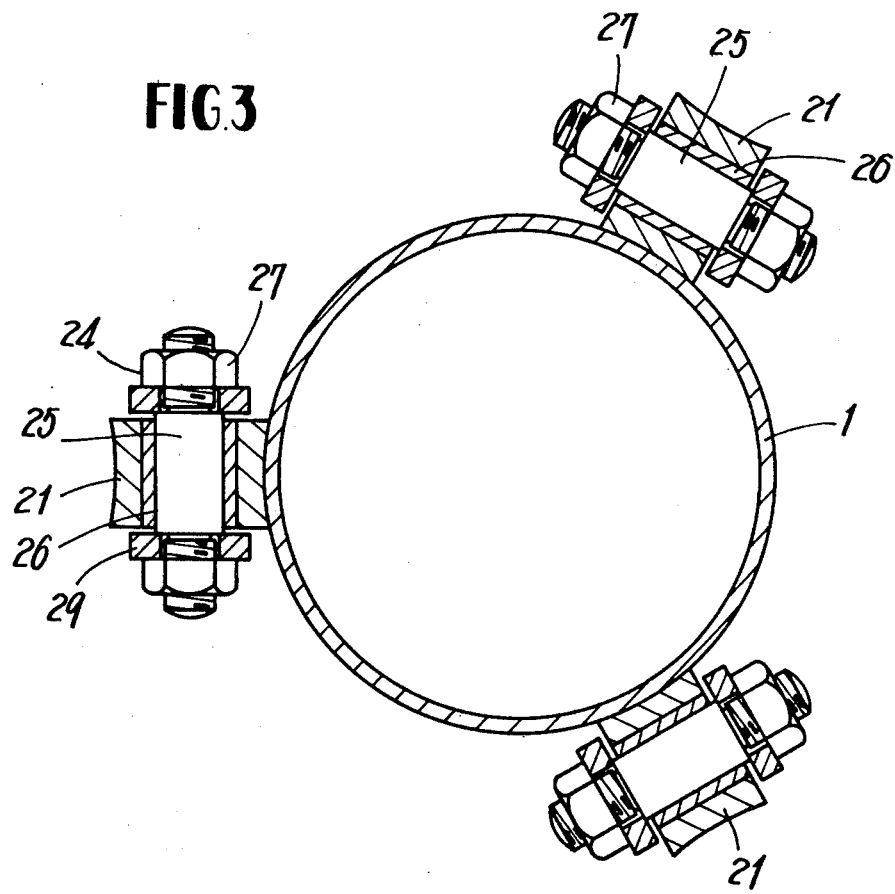
FIG. 3 is a view in section taken along the line III—III in FIG. 1.
Figure 4:
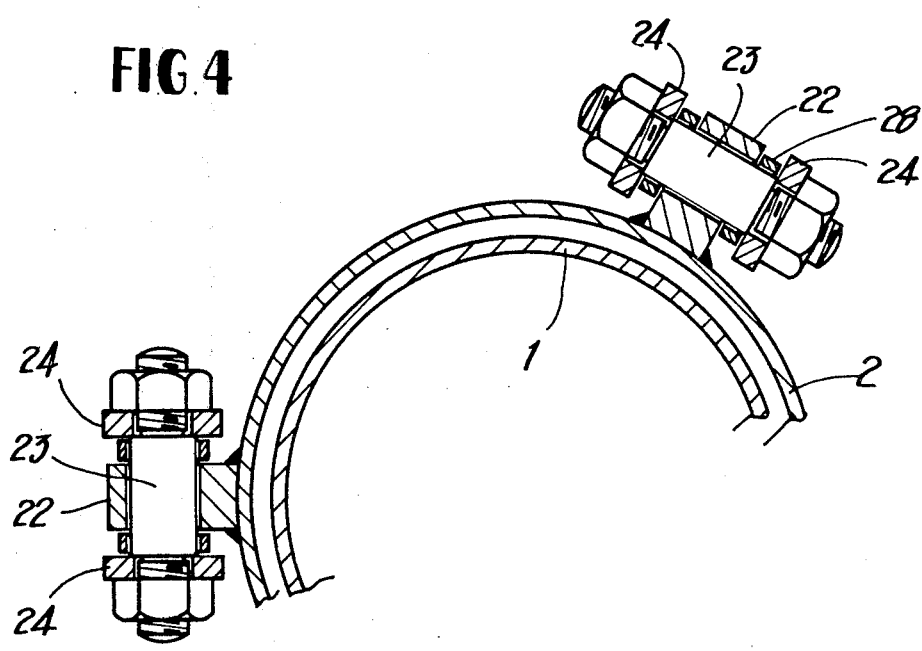
FIG. 4 is a fragmentary view in section taken along the line IV—IV in FIG. 1.

The first embodiment shown in FIGS. 1 to 4 includes an inner pipe 1 in the form of a straight tube and a similar outer pipe 2. These two pipes 1 and 2 are coaxial with each other, fitted one within the other and axially slidable relative to each other to constitute a telescopic assembly 3 for conveyor pipes. The unfitted ends of the inner pipe 1 and outer pipe 2 are respectively connected to conveyor pipes 4 and 5 which are bent pipes in the illustrated embodiment. As indicated by the arrows in FIG. 1, air or gas flows from one side where the conveyor pipe 4 and the inner pipe 1 are positioned to the other side where the outer pipe 2 and the conveyor pipe 5 are located, namely in the direction toward which the cross sectional area of the flow channel increases. A connecting flange 6 is welded to the outer periphery of the end of the conveyor pipe 4, and a connecting flange 7 is welded to one end of the inner pipe 1. Similarly, connecting flanges 8 and 9 are welded to the outer pipe 2 and the conveyor pipe 5. The flanges 6 and 7, as well as the flanges 8 and 9, are securely fastened together by bolts 10 and nuts 11. At these flange connections, the end of one pipe fits in the flange on the opposed end of the other pipe in the form of a so-called socket and spigot joint, providing a hermetic joint.

A suitable clearance is formed between the two pipes 1 and 2. A labyrinth packing 12 provided around the front end of the inner pipe 1 seals the clearance while permitting sliding of the two pipes relative to each other. The labyrinth packing 12 comprises a stopper ring 14 and a retainer ring 15 both screwed on an externally threaded portion 13 formed at the front end of the pipe 1 over a suitable axial length, and sealing rings 16 and distance rings 17 arranged alternately between and held by the two rings 14 and 15. The outer periphery of each of the sealing rings 16 is positioned very close to the inside peripheral surface of the outer pipe 2 with a minute clearance formed therebetween. The distance rings 17 hold the sealing rings 16 spaced apart, providing the minute clearances as arranged at a suitable distance axially of the pipe and forming suitable spaces between the minute clearances. The outer extremity of the retainer ring 15 is in engagement with the edge of the front end of the inner pipe 1.

A scraper 18 comprises a plurality of hard divided pieces attached to the retainer ring 15 by plate springs 19 and arranged circumferentially of the ring. The scraper 18 is positioned in front of the front end of the inner pipe 1 and is elastically held by the plate springs 19 in pressing contact with the inside peripheral surface of the outer pipe 2. The scraper is not limited to the illustrated one but may be made up of a single elastic member in its entirety and can be attached directly to the inner pipe end instead of being attached to the ring 15.

Spacer means 20 is mounted on one end of the outer pipe 2 to maintain a uniform clearance between the inner pipe 1 and the outer pipe 2. In the illustrated embodiment, the spacer means comprises a plurality of (e.g. three as illustrated) rollers 21 equidistantly arranged on the inner pipe 1 circumferentially thereof and rollable on the outside peripheral surface of the pipe 1 axially thereof, and means for supporting the rollers 21 on the end of the outer pipe 2. The roller supporting means comprises a bracket 22 projecting from the outside surface of the outer pipe 2, a lever 24 pivotably supported at its intermediate portion by a bolt 23, and means for locking the lever 24. The roller 21 is rotatably mounted on one end of the lever 24 by means of a bolt 25 and a journal bearing 26. Indicated at 27 are nuts for holding the lever 24 and roller 21 on the bolts 23 and 25, and at 28 are washers provided between the bracket and the lever 24. The locking means for the lever 24 can be embodied variously. The locking means in the illustrated embodiment, adapted for the adjustment of the position of the lever 24, includes an adjusting bolt 29 extending through the other end of the lever 24 radially of the pipe in screw-thread engagement with the lever 24, the bolt 29 bearing on the outside peripheral surface of the outer pipe 2 at its threaded end, whereby the roller 21 can be locked in pressing contact with the outside peripheral surface of the inner pipe 1. The clearance between the inner and outer pipes 1 and 2 is adjustable by the adjusting bolt 29.

With the embodiment described, the telescopic assembly 3 is freely extensible or collapsible by the axial movement of the inner pipe 1 and the outer pipe 2 relative to each other, with the clearance between the two pipes 1 and 2 sealed with the labyrinth packing 12. The material to be conveyed is conveyed as entrained in an air or gaseous stream uniformly flowing through the channel provided by the conveyor pipes including the telescopic assembly 3. When during or after transport the telescopic assembly 3 is collapsed, namely when the inner and outer pipes are moved relative to each other to a greater overlapping degree, the scraper 18 scrapes off the deposit of the material if any from the inside peripheral surface of the outer pipe 2 at the front end of the inner pipe 1, namely in front of the labyrinth packing 12 with respect to the direction of the movement of the packing, thus eliminating the likelihood that the material will be forced into the labyrinth ring 12 and cause wear or damage to the packing. Furthermore, the scraper 18 and the spacer means 20, which maintain a uniform clearance between the inner pipe 1 and the outer pipe 2, permit the pipes to move smoothly relative to each other, enabling the labyrinth packing to afford a stabilized sealing effect and preventing the sealing rings of the packing against abrasion from sliding contact with the inside surface of the outer pipe.

Figure 5:
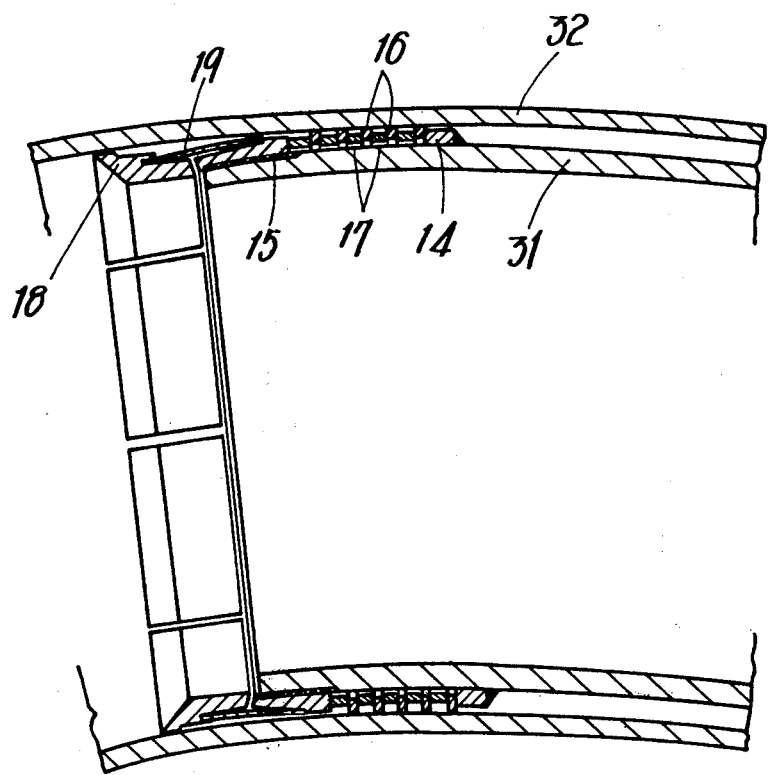
FIG. 5 is a view in vertical section showing a second embodiment of this invention.

While the pipes 1 and 2 of the assembly of the first embodiment are each in the form of a straight tube, the second embodiment shown in FIG. 5 comprises an inner pipe 31 and an outer pipe 32 which are in the form of a circular arc. The circular arc telescopic assembly gives a desired bent to the conveyor pipe line. In this embodiment, the stopper ring 14 is secured to the outside peripheral surface of the inner pipe 31 by welding.

Further according to this invention, the inner pipe 1 and the outer pipe 2 can be made turnable relative to each other about their common axis, whereby the present assembly is made serviceable as a swivel portion which is telescopic and also bendable or swivellable. Accordingly, the structural elements of the telescopic assembly of this invention, when variously combined, can provide a conveyor pipe which is freely movable vertically, horizontally or in a swivelling fashion within a three-dimensional space.

Although the foregoing description has been given of conveyor pipes through which an air or gaseous suction stream flows, the present invention is also applicable to conveyor pipes utilizing a pressurized air or gaseous flow. Moreover, this invention is not limited to the telescopic assembly for movable conveyor pipes but is also useful in fixed conveyor pipes for the absorption of thermal expansion or contraction.

What is claimed is:

1. A telescopic pipe assembly comprising an inner pipe and an outer pipe each having an end coaxially fitted one within the other for bi-directional relative axial movements, a scraper attached to said end of the inner pipe and elastic means for urging the scraper into pressing contact with the inside peripheral surface of the outer pipe, packing means mounted on the outer peripheral surface of the inner pipe inwardly of said end from said scraper for providing a minute clearance with the inside peripheral surface of the outer pipe, and spacer means mounted on the outer pipe adjacent said end thereof, said spacer means including a plurality of rollers contacting the outer peripheral surface of the inner pipe for maintaining a uniform clearance between said pipes.

2. A telescopic assembly as defined in claim 7 wherein the two pipes are each in the form of a circular arc.

3. A telescopic assembly as defined in claim 1 wherein the scraper comprises a plurality of segments arranged circumferentially of the inner pipe, and said elastic means comprises a plate spring for each segment.

4. A telescopic assembly as defined in claim 1 wherein the packing means comprises a stopper ring, a plurality of sealing rings arranged at suitable spacing in the axial direction of the pipe with a minute clearance formed between the inside peripheral surface of the outer pipe and the outer periphery of each of the sealing rings, distance rings disposed between the sealing rings, and a retainer ring fitting around said end of the inner pipe in screw threaded engagement therewith.

5. A telescopic assembly as defined in claim 4 wherein the scraper comprises a plurality of divided pieces arranged circumferentially of the pipe, each of the divided pieces being attached to said end of the inner pipe by a plate spring.

6. A telescopic assembly as defined in claim 4 wherein the scraper is attached to said retainer ring.

7. A telescopic assembly as defined in claim 1 wherein said spacer means comprises at least one lever pivotally mounted on the outer pipe and carrying one of said rollers, and means for locking the lever in a position in which the rollers contact the outer peripheral surface of the inner pipe.

8. A telescopic assembly as defined in claim 7 wherein said locking means comprises an adjusting bolt threadedly engaging the lever and extending radially of the outer pipe, the bolt having an end bearing against the outer peripheral surface of the outer pipe.

9. A telescopic assembly as defined in claim 1 wherein said spacer means comprises a plurality of levers, each lever having an intermediate portion pivotally mounted on the outer pipe and carrying one of said rollers at one end of the lever, and an adjusting bolt threadedly carried by the other end of each lever and engageable with the outer peripheral surface of the outer pipe.

* * * * *

UNITED STATES PATENT AND TRADEMARK OFFICE
CERTIFICATE OF CORRECTION

PATENT NO. : 4,131,303
DATED : December 26, 1978
INVENTOR(S) : KATSUMI NAGASAKI ET AL It is certified that error appears in the above-identified patent and that said Letters Patent are hereby corrected as shown below:

Column 5, line 21, "7" should read -- 1 --.

Column 6, line 4, "screw threaded" should read

-- screw-threaded --.

Signed and Sealed this

Third Day of July 1979

[SEAL]

Attest:

LUTRELLE F. PARKER
Attesting Officer     Acting Commissioner of Patents and Trademarks